United States Patent
Kim et al.

(10) Patent No.: US 7,227,874 B2
(45) Date of Patent: Jun. 5, 2007

(54) APPARATUS AND METHOD FOR DETERMINING A MODULATION SCHEME IN A COMMUNICATION SYSTEM

(75) Inventors: Min-Goo Kim, Suwon-shi (KR); Sang-Hyuck Ha, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 1011 days.

(21) Appl. No.: 10/194,621

(22) Filed: Jul. 12, 2002

(65) Prior Publication Data

US 2003/0031122 A1  Feb. 13, 2003

(30) Foreign Application Priority Data

Jul. 12, 2001 (KR) .............................. 2001-41884

(51) Int. Cl.
*H04J 3/22* (2006.01)
(52) U.S. Cl. .............. 370/468; 370/204; 375/298; 375/300
(58) Field of Classification Search ............ 370/522, 370/394, 330, 329, 468, 430, 207, 204; 455/452.2; 375/260, 326, 222, 146, 298, 300; 714/755
See application file for complete search history.

(56) References Cited

U.S. PATENT DOCUMENTS

| 6,707,862 | B1 * | 3/2004 | Larsson ..................... 375/326 |
| 7,039,846 | B2 * | 5/2006 | Hewitt et al. ............... 714/755 |
| 2002/0155835 | A1 * | 10/2002 | Pankaj et al. .............. 455/439 |
| 2006/0114910 | A1 * | 6/2006 | Sindhushayana et al. ... 370/394 |

FOREIGN PATENT DOCUMENTS

| EP | 0 713 337 | 5/1996 |
| EP | 1 162 774 | 12/2001 |
| KR | 2001-63518 | 10/2001 |

\* cited by examiner

*Primary Examiner*—John Pezzlo
(74) *Attorney, Agent, or Firm*—The Farrell Law Firm

(57) ABSTRACT

An apparatus and method for determining an optimum modulation scheme and code rate in a communication system using a variable transmission scheme. In a transmitter included in the communication system, an encoder encodes an encoder packet (EP) and a plurality of modulators having different modulation orders modulate sub-packets being codewords output from the encoder. A selector selects one of the modulators by comparing an MPR (Modulation order Product code Rate) being a ratio of an EP size to a number of payload modulation symbols, and comparing the MPR with a threshold.

30 Claims, 6 Drawing Sheets

APPARATUS AND METHOD FOR DETERMINING A MODULATION SCHEME IN A COMMUNICATION SYSTEM

PRIORITY

This application claims priority to an application entitled "Apparatus and Method for Determining Modulation Scheme in a Communication System" filed in the Korean Industrial Property Office on Jul. 12, 2001 and assigned Serial No. 2001-41884, the contents of which are hereby incorporated by reference.

BACKGROUND OF THE INVENTION

1. Field of the Invention

The present invention relates generally to a communication system using a variable transmission scheme, and in particular, to an apparatus and method for determining an optimum modulation scheme and code rate in a given environment.

2. Description of the Related Art

Although a typical communication system adopts a fixed transmission scheme for data transmission, communication technology has been developed to transmit data in a variable transmission scheme. For example, a future generation mobile communication system developed by the 3GPP2 (the $3^{rd}$ Generation Partnership Project 2) adopts a variable transmission scheme.

Thee L3QS (Lucent technology co., LSI co., LG electronics and Qualcomm co., Samsung electronics co.) framework proposal contributed to the 3GPP2 TSG-C WG5 in June 2000 for standardization of 1× EV-DV (1× Evolution-Data and Voice) developed by the 3GPP2 has provided a synopsis of data rates with respect to six EP (Encoder Packet) sizes (i.e., 384, 768, 1536, 2304, 3072, and 3840 bits) in six tables. These data rate tables are designed to increase channel transmission efficiency by supporting a variety of packets transmitted at each instant. An EP is a packet input to an encoder. It is necessary to select an appropriate EP size among the six EP sizes according to channel condition, data backlog (i.e., the status of buffers having data received from a higher layer), and the number of available Walsh codes (NAWC). One of the significant factors for EP size selection is selection of a modulation scheme. For packets with the same EP size, different modulation schemes and different code rates of an error correction code may be applied depending on their transmission durations and NAWC.

Each of the data rate tables lists 69 to 111 different modulation and code rate combinations according to the number of available Walsh codes (NAWC) and the number of slots per sub-packet. For example, if EP size=384, NAWC=28, and NOS (Number Of Slots)=8, then a modulation order=2 (QPSK) and a code rate=0.017857. If EP size=384, NAWC=27, and NOS=8, then a modulation order=2 (QPSK) and a code rate=0.037037. Therefore, it is very important to select an optimum modulation scheme and code rate in a given environment in a communication system using a variable transmission scheme in time.

SUMMARY OF THE INVENTION

It is, therefore, an object of the present invention to provide a criterion in selecting an AMC (Adaptive Modulation & Coding) and to provide an apparatus and method for determining the most efficient modulation scheme and error correction code rate based on the criterion.

To achieve the above and other objects, there are provided an apparatus and method for determining an optimum modulation scheme and code rate in a communication system using a variable transmission scheme. In a transmitter in the communication system, an encoder encodes an encoder packet (EP), a plurality of modulators having different modulation orders modulate sub-packets being codewords output from the encoder. A selector selects one of the modulators by comparing an MPR (Modulation order Product code Rate) being the ratio of an EP size to the number of payload modulation symbols and comparing the MPR with a threshold.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
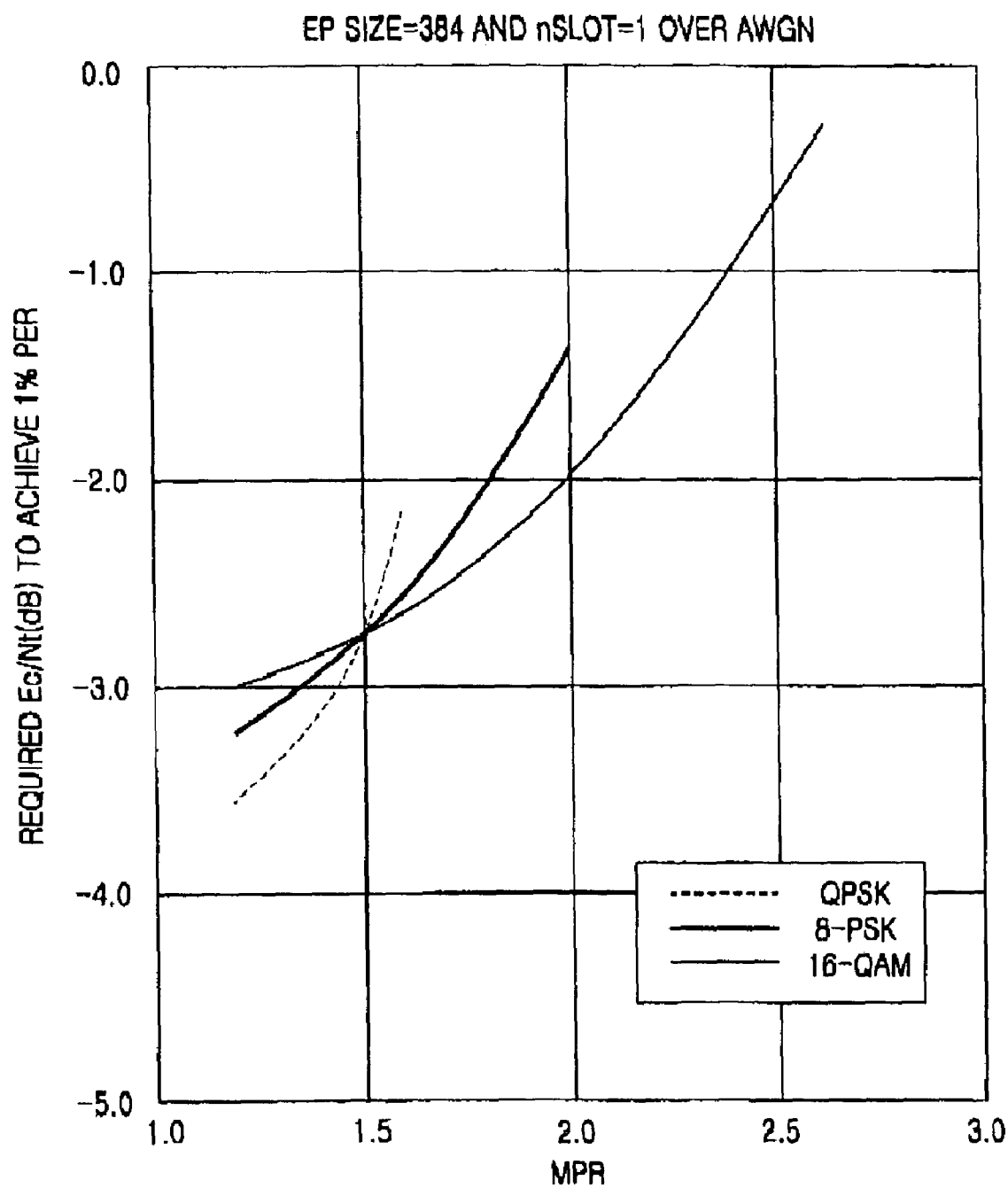
FIG. 1 illustrates three lines indicating Ec/Nt (dB) required to achieve 1% PER with respect to the MPR in QPSK, 8-PSK, and 16-QAM when an EP size is 384 bits.

A preferred embodiment of the present invention will be described herein below with reference to the accompanying drawings. In the following description, well-known functions or constructions are not described in detail since they would obscure the invention in unnecessary detail.

The following description is made of an analysis of the relationship between each data rate and a modulation scheme & code rate, a criterion in determining an optimum modulation order, and selection of a modulation scheme (or a modulation order) & code rate according to the criterion. In accordance with an embodiment of the present invention, MPR (Modulation order Product code Rate) is given as a criterion for selection of a modulation scheme & code rate. Therefore, MPR calculation and an apparatus and method for selecting a modulation scheme & code rate according to an MPR will also be described.

It is important to note that the terms "modulation scheme" and "modulation order" are used in the same sense. As stated above, "EP" is a packet to be encoded in an encoder and "sub-packet" is a codeword output from the encoder. A sub-code generating apparatus (or a quasi-complementary turbo code generating apparatus) can be used as the encoder (see FIG. 2 in Korea Patent Application No. 2001-63518 entitled "Code Generating Apparatus and Method in a Communication System", filed by the present applicant on Oct. 15, 2001). According to the application, the quasi-complementary turbo code (QCTC) generating apparatus includes a channel encoder for turbo-encoding an input information bit stream and a sub-code generator for generating a sub-code by puncturing and repeating code symbols received from the channel encoder. A code rate R=⅕ is available to the channel encoder, and a code rate R=2/3, 1/3, or ⅙ is available to the sub-code generator. The former code rate is called a mother code rate and the latter code rate, a sub-code rate. A sub-packet is a term indicating a codeword encoded at a sub-code rate. When using a turbo encoder, the sub-packet is a codeword encoded at a mother code rate. Notably, these terms have been used since the prior art.

Definition of MPR

It is generally known that the increment of a coding gain increases slowly as a code rate is decreased in a digital communication system using error correction codes. The coding gain is a relative gain resulting from the use of an error correction code, which otherwise might not have been obtained. In other words, a bit error rate (BER) gradually reaches its saturation point as the code rate decreases. On the contrary, as the code rate increases, the increments of the coding gain and the BER rapidly decrease. This is well known as the result of "Shannon's Channel Capacity theory" in this field. Thus the above characteristics will not be described in detail, and it should be made clear that the present invention is operated based on the known principles.

Given the same SNR (Signal-to-Noise Ratio), the BER varies within a limited range according to an increase or a decrease of a modulation order in digital modulation. Specifically, a higher SNR is required for a digital modulation scheme having a higher modulation order in order to achieve the same BER. Therefore, if a system uses a predetermined modulation symbol transmission rate, many modulation order & code rate combinations may be available.

Taking into account the characteristics of error correction codes and digital modulation, it is more efficient to use a low-order modulation scheme at a low code rate, for example, QPSK (Quadrature Phase Shift Keying) rather than to further decrease the overall code rate by adopting a high-order modulation scheme. On the contrary, it is better to use a high-order modulation scheme at a high code rate to thereby prevent the increase of an error rate.

Yet, since a code rate is calculated to achieve the same spectral efficiency after a modulation order is determined, an accurate code rate cannot be determined before the modulation order is determined. Therefore, a novel function will be defined in terms of spectral efficiency involving both the modulation order and the code rate according to the present invention.

With regard to the six data rate tables in the aforementioned L3QS framework proposal, the number of payload modulation symbols is a function of NAWC and NOS in a transmitter, expressed as number of payload modulation symbols =1536× $(NAWC/32) \times NOS$ (1)

where 1536 $(=(1.2288\times10^6)\times(1.25\times10^{-3}))$ is the number of PN (Pseudo Noise) chips per 1.25 ms-slot at 1.2288 Mcps. The number of payload modulation symbols can also be calculated by number of payload modulation symbols =$(EP$ size$)/$ ((modulation order)×(code rate)) (2)

When the product of the modulation order and the code rate in Eq. (2) is defined as an MPR, then $$MPR = (EP \text{ size})/(\text{number of payload modulation symbols}) \quad (3)$$
$$= (EP \text{ size})/(48 \times NAWC \times NOS)$$

which is a special equation of Eq. (2). Eq. (3) represents an MPR when a chip rate is 1.2288 Mcps and a slot is 1.25 ms in duration. 48 is the number of modulation symbols covered by a Walsh code with length of 32 for 1.25 ms slot duration. Thus, 48×NAWC is the number of modulation symbols for 1.25 ms slot duration. Consequently, the number of payload modulation symbols is 48×NAWC×NOS. Given the maximum NAWC (i.e., 32), the number of payload modulation symbols is the product of a transmission duration for an EP (=slot duration 1.25 ms×NOS) and the chip rate 1.2288 Mcps.

As described above, the MPR is a function of EP size, NAWC, and NOS. If these parameters are given, the MPR is determined. Then, the modulation order increases as the code rate decreases, and vice versa.

Given a modulation order, a very low MPR is equivalent to a very low code rate. For example, the modulation order of QPSK is 2. When MPR=0.5, a code rate is ¼(=0.5/2). On the contrary, a very high MPR is equivalent to a very high code rate. For example, when MPR=4/3 in QPSK, a code rate is ⅔(=(4/3)/2). Therefore, when a plurality of modulation schemes are available such as QPSK, 8-PSK (Phase Shift Keying), 16-QAM (Quadrature Amplitude Modulation), and 64-QAM, if an MPR is small, it is preferable to adopt QPSK having a relatively low modulation order. If the MPR is relatively great, 8-PSK, 16-QAM, or 64-QAM is preferable due to their relatively high modulation orders. The modulation orders of QPSK, 8-PSK, and 16-QAM are 2, 3, and 4, respectively. However, if the MPR is neither high nor low, it is not easy to determine which modulation scheme to select. Determination of a modulation order without relying on a correct criterion may reduce system throughput. In the present invention, a modulation scheme is selected in the following way.

It is necessary first to analyze the range of an MPR for each modulation scheme. Let the modulation order be k and the code rate be R. Then, since MPR=k×R according to Eq. (2), R=MPR/k. Supposing that $R_{max}$ is defined as an allowable maximum code rate, then $$0 < R = MPR/k \leq R_{max} \quad (4)$$

When k=4 (16-QAM) and $R_{max}$=0.8, $$0 < MPR \leq k \times R_{max} \leq 4 \times R_{max} \, 0 < MPR \leq 3.2 \quad (5)$$

Determination of Modulation Order

As noted from Eq. (3), the MPR is equivalent to the number of information bits transmitted in a single symbol. Then the MPR reflects spectral efficiency and the same MPR is equivalent to the same spectral efficiency. In this case, the modulation order must be determined to be a value that ensures the lowest error rate (BER or PER: Packet Error Rate) within a corresponding operation SNR range, taking into account the trade-off between modulation and coding. If a modulation scheme having a minimum PER can be determined according to the MPR, the modulation order can be determined correspondingly. In the present invention, such an MPR is calculated and a modulation scheme is determined according to the MPR.

In order to determine the most effective modulation scheme for each of the six EP sizes in the L3QS framework proposal, a simulation was performed under the environment specified in Table 1.

TABLE 1

| | |
|---|---|
| Physical Channel | AWGN |
| Payload Size | 384, 768, 1536, 2304, 3072, 3840 |
| Channel Interleaver | P-BRO Interleaver |
| Modulation Order | QPSK, 8-PSK, 16-QAM |
| Modulation Mapping | Systematic Mapping Scheme for 8-PSK and 16-QAM |
| Mother Code Rate | 1/5 |
| Decoding Algorithm | Max LogMAP |
| Max Number of Iterations | 8 |

Referring to Table 1, the simulation was over an AWGN (Additive White Gaussian Noise) physical channel. As described before, the channel transmitter may be comprised of a turbo encoder, a sub-code generator, and a plurality of modulators having different modulation orders. The modulators are a QPSK modulator having a modulation order of 2, an 8-PSK modulator having a modulation order of 3, and a 16-QAM modulator having a modulation order of 4, by way of example. The mother code rate is 1/5 and the channel transmitter includes a P-BRO (Partial Bit Reverse Order) Interleaver. A decoder for a channel receiver corresponding to the channel transmitter decodes using a Max LogMAP (Maximum A Posteriori) algorithm. Iterations are done up to eight times.

Figure 2:
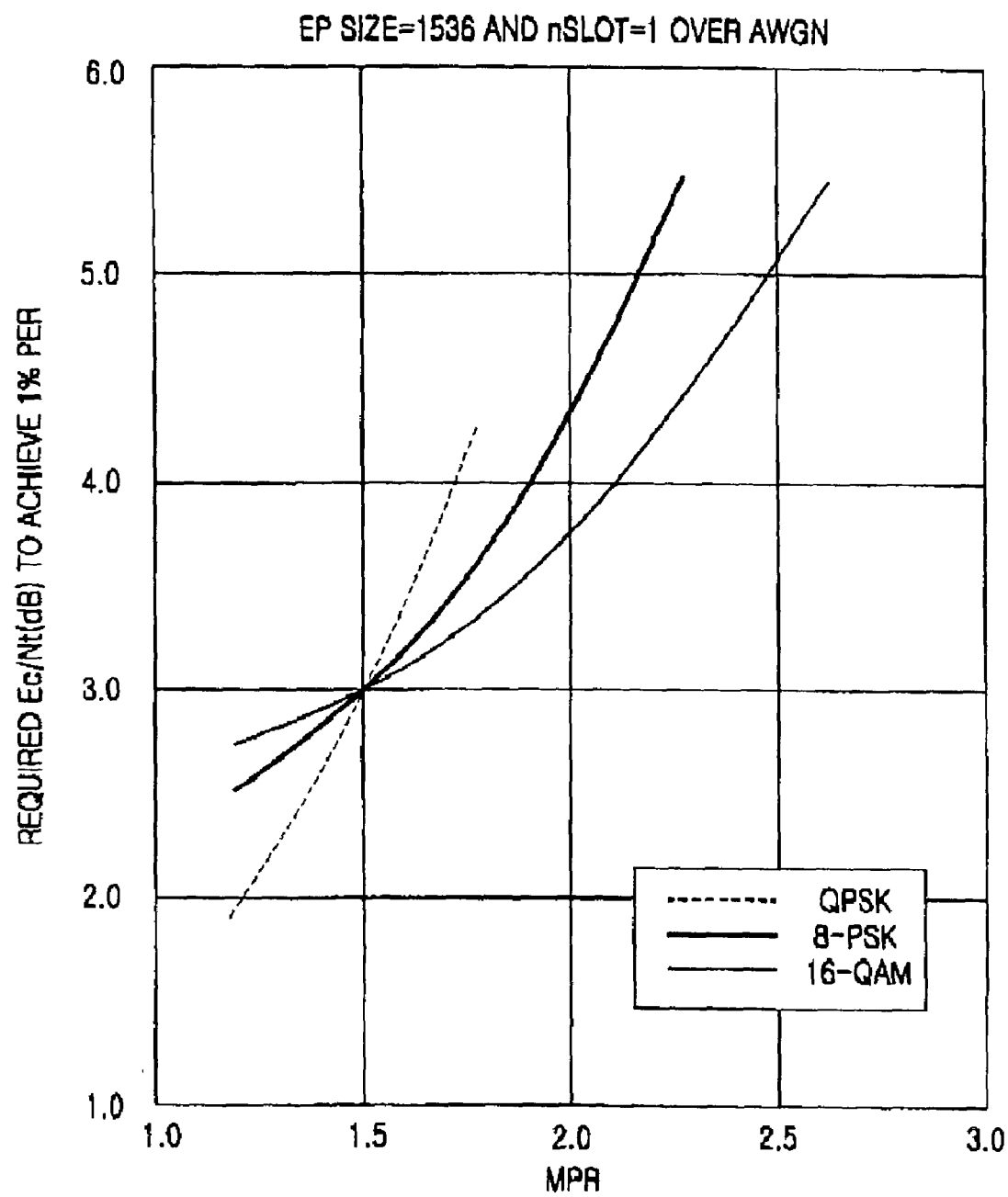
FIG. 2 illustrates three lines indicating Ec/Nt(dB) required to achieve 1% PER with respect to the MPR in QPSK, 8-PSK, and 16-QAM when an EP size is 1536 bits.
Figure 3:
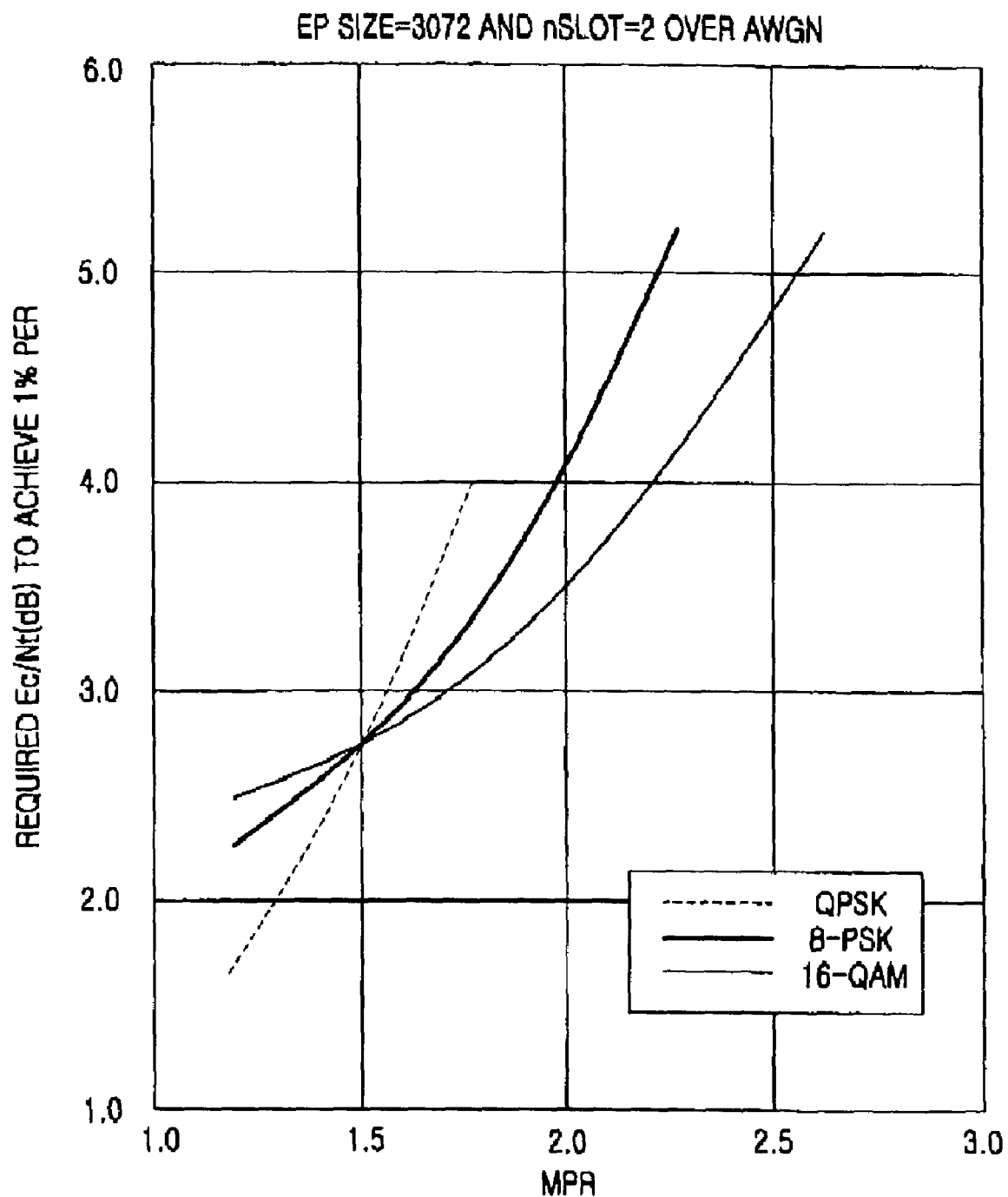
FIG. 3 illustrates three lines indicating Ec/Nt(dB) required to achieve 1% PER with respect to the MPR in QPSK, 8-PSK, and 16-QAM when an EP size is 3072 bits.

The results of the simulation are illustrated in FIGS. 1, 2, and 3. Referring to FIG. 1, when EP size=384 bits, Ec/Nt (dB) required to achieve 1% PER in QPSK, 8-PSK, and 16-QAM is illustrated with respect to an MPR. Ec/Nt(dB) is a kind of SNR, indicating the ratio of unit chip energy to noise power density. Hence, as Ec/Nt(dB) increases, more power is required to achieve the same PER.

As illustrated in FIG. 1, the required Ec/Nt(dB) increases with the MPR and the variances of Ec/Nt(dB) with respect to changes in the MPR are different according to the modulation schemes. If the MPR is 1.5, the line for QPSK lies above the line for 16-QAM. If the MPR is less than or equal to 1.5, QPSK has the best performance. If the MPR is greater than 1.5, 16-QAM has the best performance. 8-PSK is in the middle between of QPSK and 16-QAM in performance. When the MPR is 1.5, the code rates of QPSK, 8-PSK, and 16-QAM are 3/4, 1/2, and 3/8, respectively. The modulation schemes have the same performance at an MPR of 1.5, which implies that the same system performance is achieved irrespective of modulation schemes when one modulation symbol transmits 1.5-bit information. When NAWC and NOS are changed, only values on the vertical axis vary while the lines are intact in inclination.

FIG. 2 illustrates three lines for the modulation schemes indicating Ec/Nt(dB) required to achieve 1% PER with respect to the MPR when EP size=1536 bits. The lines show the same characteristics as the lines in the case where EP size=384 bits (as illustrated in FIG. 1). The lines intersect at the MPR threshold 1.5, and QPSK and 16-QAM have the best performance below and above the threshold, respectively. Similarly to the lines in FIG. 1, the performances of the modulation schemes are altered at the MPR 1.5 when the EP size is 1536 bits.

FIG. 3 illustrates three lines for the modulation schemes indicating Ec/Nt(dB) required to achieve 1% PER with respect to the MPR when EP size=3072 bits. Similarly to when EP size=384 bits and 1536 bits, the performances of QPSK and 16-QAM are reversed at the MPR 1.5.

It can be concluded from the simulation that regardless of EP size, QPSK and 16-QAM are effective below MPR=1.5, and at or above MPR=1.5, respectively. Regardless of EP size, there is a single threshold MPR at which a modulation order is determined. In the simulation result, however, it is not considered that AM(Amplitude modulation) scheme such as 16-QAM shows poorer performance than 16-QAM PSK modulation scheme such as QPSK and 8-PSK in practical field environments. If a theory or simulation results exist considering the performance gap between AM and PSK modulation, MPR threshold can be a different value from 1.5 and a plurality of MPR thresholds can exist. Therefore, available modulation schemes are not limited to QPSK and 16-QAM, but the other modulation schemes can be used additionally.

Now a description will be made of an embodiment of the present invention for determining the modulation order according to the principle obtained from the simulation results.

Embodiment

A modulation scheme selecting operation according to an embodiment of the present invention will be described below in the context of a transmitter having two modulators, i.e., a 16-QAM modulator and a QPSK modulator. However, the number of modulators is not limited. It is assumed in the following description that a chip rate is 1.22878 Mcps, a slot is 1.25 msec in duration, and a Walsh length is 32.

Figure 4:
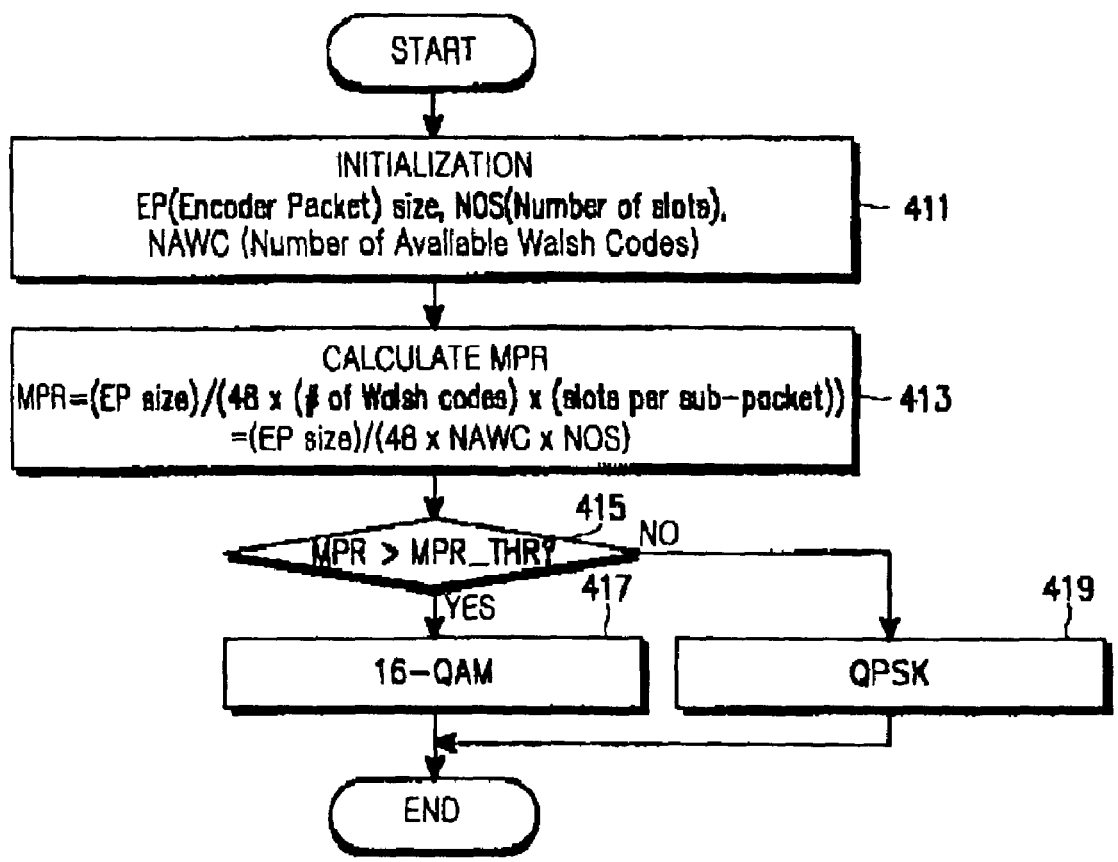
FIG. 4 is a flowchart illustrating a modulation scheme determining procedure according to an embodiment of the present invention.

FIG. 4 is a flowchart illustrating a modulation scheme (or a modulation order) selecting procedure according to an embodiment of the present invention. Hereinbelow, a device for determining a modulation scheme is referred to as a modulation selector.

Referring to FIG. 4, the modulator selector performs initialization in step 411. Specifically, the modulator selector determines an EP size, NAWC, and NOS. The modulator selector calculates an MPR using the parameters by Eq. (3) in step 413. In step 415, the modulator selector compares the MPR with a threshold MPR (MPR_THR). For example, the threshold MPR is set to 1.5 preferably. If the MPR is greater than the threshold, the modulator selector selects 16-QAM and a 16-QAM modulator in step 417. On the other hand, if the MPR is less than or equal to the threshold, the modulator selector selects QPSK and a QPSK modulator in step 419.

Figure 5:
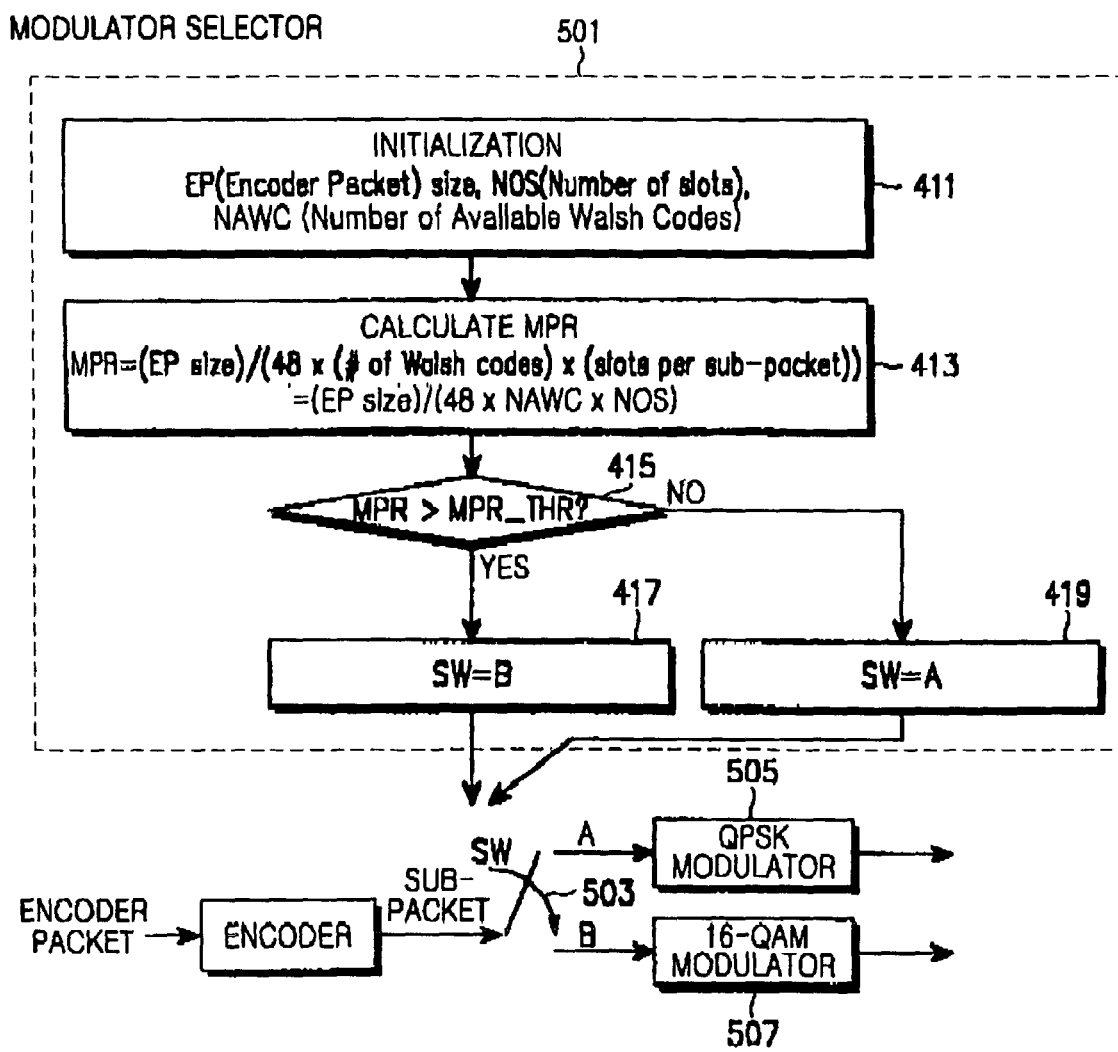
FIG. 5 is a block diagram of a modulator selecting apparatus according to the embodiment of the present invention.

FIG. 5 is a block diagram of a modulator selecting apparatus that performs the algorithm illustrated in FIG. 4 according to the embodiment of the present invention. Referring to FIG. 5, a modulator selector 501 outputs a selection signal indicating an optimum modulator by performing steps 411 to 419 illustrated in FIG. 4. That is, the modulator selector 501 calculates the MPR using the EP size, NAWC, and NOS and compares the MPR with the threshold. If the MPR is greater than the threshold, the modulator selector 501 outputs a first switching signal (SW=B). If the MPR is less than or equal to the threshold, it outputs a second switching signal (SW=A). A switch 503 switches according to a switching signal received from the modulation selector 501 and outputs input data as a sub-packet from the encoder to a QPSK modulator 505 or a 16-QAM modulator 507. The QPSK modulator 505 QPSK-modulates the data and the 16-QAM modulator 507 16-QAM-modulates the data.

To select one of modulators with different orders to modulate a sub-packet being a codeword output from an encoder, the modulator selector 501 obtains an MPR by calculating the ratio of the EP size to the number of payload modulation symbols and compares the MPR with the threshold (MPR_THR). The number of the payload modulation symbols is determined by the transmission duration of the EP, NAWC, and a given chip rate. If a maximum NAWC is given, the number of the payload modulation symbols is the product of the transmission duration and the chip rate. If the MPR is greater than the threshold, a modulator having a higher modulation order (e.g., 16-QAM) is selected. If the MPR is less than or equal to the threshold, a modulator having a lower modulation order (e.g., QPSK modulator) is selected.

While the modulator selector 501 selects one of QPSK and 16-QAM by comparing the MPR with the threshold, it is obvious to those skilled in the art that the modulator selector 501 can be so configured that it selects one of QPSK, 8-PSK, and 16-QAM. For example, a first threshold (MP_TH) is set to select QPSK or 8-PSK and a second threshold (MPR_THRΔ) is set to select 8-PSK or 16-QAM.

Since the MPR is the product of a modulation order and a code rate, the code rate can also be determined in the embodiment of the present invention. That is, after the MPR is calculated and the modulation order is determined to select one of the modulators, a code rate for an encoder can be derived.

Figure 6:
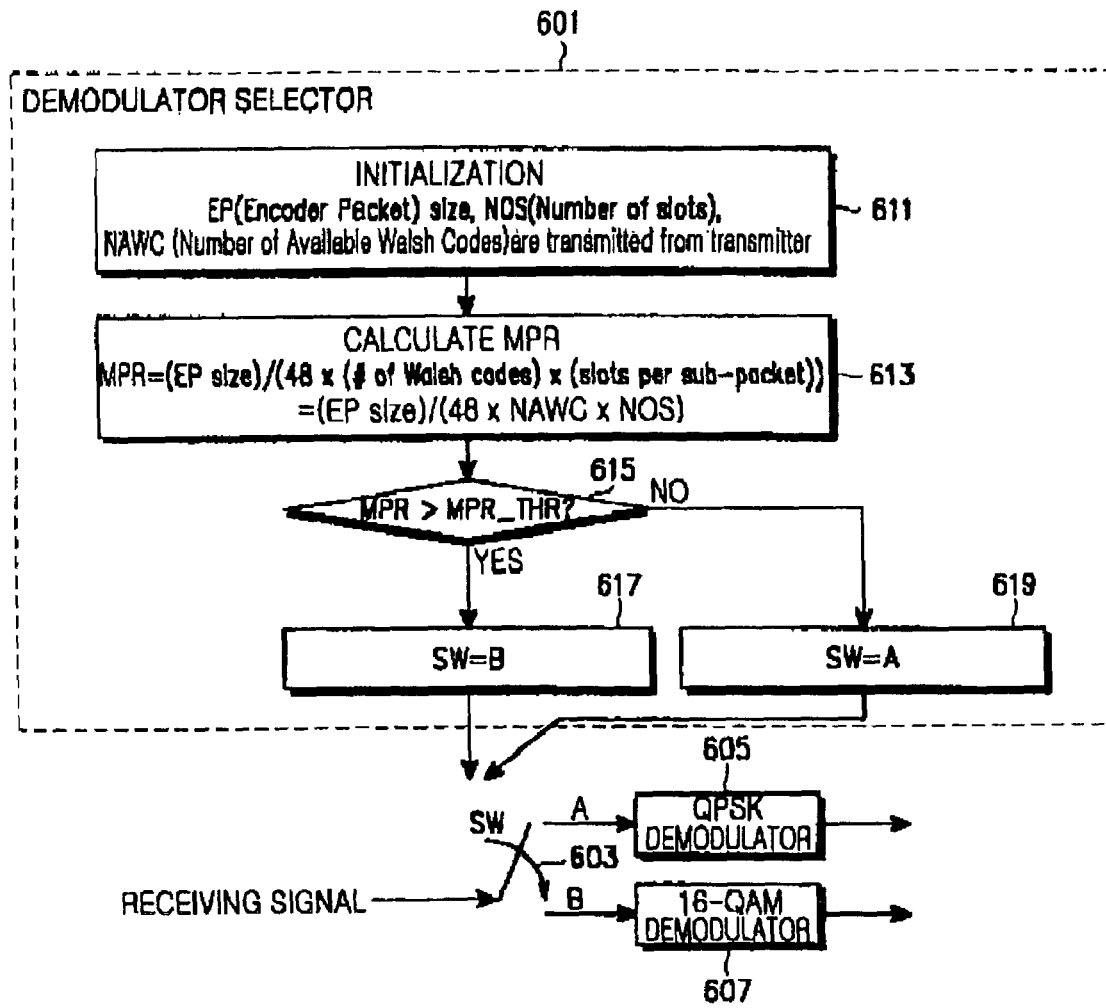
FIG. 6 is a block diagram of a demodulator selecting apparatus according to the embodiment of the present invention.

FIG. 6 is a demodulator selecting apparatus corresponding to the modulator selecting apparatus illustrated in FIG. 5. Referring to FIG. 6, a demodulator selector 601 determines the modulation scheme used in the transmitter by comparing the MPR calculated using the EP size, NAWC, and NOS received from the transmitter with the threshold. Specifically, the demodulator selector 601 determines the EP size, NAWC, and NOS as used in the transmitter in step 611 and calculates the MPR using the parameters by Eq. (3) in step 613. Then, the demodulator selector 601 compares the MPR with the threshold used in the transmitter in step 615. If the MPR is greater than the threshold, the demodulator selector 601 outputs a first switching signal (SW=B) indicating a 16-QAM demodulator 607 in step 617 and otherwise, it outputs a second switching signal (SW=A) indicating a QPSK demodulator 605 in step 619. A switch 603 switches input data being a received data from the transmitter to the QPSK demodulator 605 or the 16-QAM demodulator 607 according to the switching signal. The QPS demodulator 605 QPSK-demodulates the data received from the switch 603. The 16-QAM demodulator 607 16-QAM-demodulates the data received from the switch 603.

In the above description, the threshold is an empirical value, for example 1.5 in the embodiment of the present invention. Without current available data rate tables, the transmitter and the receiver can determine a modulation scheme using an EP size, NAWC, and NOS.

In accordance with the present invention as described above, an optimum modulation scheme can be determined adaptively to a given environment. Therefore, the efficiency of a transmission system is maximized.

While the invention has been shown and described with reference to a certain preferred embodiment thereof, it is a mere exemplary application. That is, while QPSK, 8-PSK, and 16 QAM have been described in the above embodiment, the present invention is also applicable to other modulation schemes. Thus it will be understood by those skilled in the art that various changes in form and details may be made therein without departing from the spirit and scope of the invention as defined by the appended claims.

What is claimed is:

1. A method for one of a plurality of modulators having different modulation orders to modulate a sub-packet being a codeword output from an encoder that receives an encoder packet (EP), comprising the steps of:
   calculating an MPR (Modulation order Product code Rate) being a ratio of an EP size to a number of payload modulation symbols; and
   selecting one of the plurality of modulators by comparing the MPR with a threshold.

2. The method of claim 1, wherein the number of payload modulation symbols is determined by a transmission duration of the EP, a number of available Walsh codes (NAWC), and a predetermined chip rate.

3. The method of claim 2, wherein if a maximum NAWC is given, the number of payload modulation symbols is a product of the transmission duration of the EP and the predetermined chip rate.

4. The method of claim 1, wherein the selecting step further comprises the step of selecting a modulator having a relatively high modulation order among the modulators when the MPR is greater than the threshold.

5. The method of claim 1, wherein the selecting step further comprises the step of selecting a modulator having a relatively low modulation order among the modulators when the MPR is less than or equal to the threshold.

6. The method of claim 1, wherein the threshold is set to select one of a QPSK modulator and a 16-QAM modulator.

7. The method of claim 6, further comprising the step of selecting the 16-QAM modulator if the MPR is greater than the threshold.

8. The method of claim 6, further comprising the step of selecting the QPSK modulator if the MPR is less than or equal to the threshold.

9. A transmitter in a communication system, comprising:
   an encoder for encoding an encoder packet (EP);
   a plurality of modulators having different modulation orders, for modulating sub-packets being codewords output from the encoder; and
   a selector for selecting one of the modulators by comparing an MPR (Modulation order Product code Rate) being the ratio of an EP size to a number of payload modulation symbols, and comparing the MPR with a threshold.

10. The transmitter of claim 9, wherein the selector determines the number of payload modulation symbols by a transmission duration of the EP, a number of available Walsh codes (NAWC), and a predetermined chip rate.

11. The transmitter of claim 10, wherein if a maximum NAWC is given, the selector determines the number of payload modulation symbols by calculating a product of the transmission duration of the EP and the predetermined chip rate.

12. The transmitter of claim 9, wherein the selector selects a modulator having a relatively high modulation order among the modulators when the MPR is greater than the threshold.

13. The transmitter of claim 9, wherein the selector selects a modulator having a relatively low modulation order among the modulators when the MPR is less than or equal to the threshold.

14. The transmitter of claim 9, wherein the plurality of modulators include a QPSK modulator and a 16-QAM modulator.

15. The transmitter of claim 14, wherein the selector selects the 16-QAM modulator if the MPR is greater than the threshold.

16. The transmitter of claim 14, wherein the selector selects the QPSK modulator if the MPR is less than or equal to the threshold.

17. A method of determining a modulation order and a code rate in a communication system having an encoder for encoding an encoder packet (EP) and a plurality of modulators for modulating a sub-packet being a codeword output from the encoder, the method comprising the steps of:

calculating an MPR (Modulation order Product code Rate) being a ratio of an EP size to a number of payload modulation symbols;

comparing the MPR with a threshold and determining a modulation order to select one of the plurality of modulators according to the comparison result; and determining a code rate for the encoder according to the MPR and the modulation order.

18. The method of claim 17, wherein the number of payload modulation symbols is a product of a number of available Walsh codes, a number of slots per sub-packet, and a number of modulation symbols covered by a Walsh code for a slot duration.

19. The method of claim 17, further comprising the step of selecting a modulator having a relatively high modulation order among the modulators when the MPR is greater than the threshold.

20. The method of claim 17, further comprising the step of selecting a modulator having a relatively low modulation order among the modulators when the MPR is less than or equal to the threshold.

21. The method of claim 17, wherein the threshold is set to select one of a QPSK modulator and a 16-QAM modulator.

22. The method of claim 21, further comprising the step of selecting the 16-QAM modulator if the MPR is greater than the threshold.

23. The method of claim 21, further comprising the step of selecting the QPSK modulator if the MPR is less than or equal to the threshold.

24. A transmitter in a communication system, comprising:
an encoder for encoding an encoder packet (EP);
a plurality of modulators having different modulation orders, for modulating sub-packets being codewords output from the encoder; and
a selector for calculating an MPR (Modulation order Product code Rate) being a ratio of an EP size to a number of payload modulation symbols, comparing the MPR with a threshold, determining a modulation order to select one of the modulators according to the comparison result, and determining a code rate for the encoder according to the MPR and the modulation order.

25. The transmitter of claim 24, wherein the selector determines the number of payload modulation symbols by multiplying a number of available Walsh codes, a number of slots per sub-packet, and a number of modulation symbols covered by a Walsh code for a slot duration.

26. The transmitter of claim 24, wherein the selector selects a modulator having a relatively high modulation order among the modulators when the MPR is greater than the threshold.

27. The transmitter of claim 24, wherein the selector selects a modulator having a relatively low modulation order among the modulators when the MPR is less than or equal to the threshold.

28. The transmitter of claim 24, wherein the plurality of modulators include a QPSK modulator and a 16-QAM modulator.

29. The transmitter of claim 28, wherein the selector selects the 16-QAM modulator if the MPR is greater than the threshold.

30. The transmitter of claim 28, wherein the selector selects the QPSK modulator if the MPR is less than or equal to the threshold.

* * * * *